United States Patent [19]

Yoshimaru et al.

[11] Patent Number: 5,239,533

[45] Date of Patent: Aug. 24, 1993

[54] INFORMATION RECORDING MEDIUM

[75] Inventors: Tomohisa Yoshimaru, Yokohama; Tsuneshi Yokota, Kawasaki, both of Japan

[73] Assignee: Kabushiki Kaisha Toshiba, Kawasaki, Japan

[21] Appl. No.: 829,589

[22] Filed: Feb. 3, 1992

Related U.S. Application Data

[63] Continuation of Ser. No. 747,481, Aug. 16, 1991, abandoned, which is a continuation of Ser. No. 456,962, Dec. 26, 1989, abandoned.

[30] Foreign Application Priority Data

Jan. 6, 1989 [JP] Japan .................................. 64-459

[51] Int. Cl.$^5$ .............................................. G11B 20/12
[52] U.S. Cl. ................................... 369/275.1; 369/51; 369/275.4
[58] Field of Search ............... 369/275.1, 275.2, 275.3, 369/275.4, 277, 278, 279, 276, 32, 51

[56] References Cited

U.S. PATENT DOCUMENTS

| | | | |
|---|---|---|---|
| 4,329,575 | 5/1982 | Roach | 369/275.3 |
| 4,357,635 | 11/1982 | Hasegawa | 369/47 |
| 4,532,621 | 7/1985 | Nakagawa | 369/111 |
| 4,700,335 | 10/1987 | Aoi | 369/51 |
| 4,811,317 | 3/1989 | Barnard | 369/32 |
| 4,873,679 | 10/1989 | Murai | 369/93 |
| 4,896,311 | 1/1990 | Ishihara | 369/47 |
| 4,918,677 | 4/1990 | Ashinoma | 369/32 |

FOREIGN PATENT DOCUMENTS

| | | | |
|---|---|---|---|
| 3830745 | 4/1989 | Fed. Rep. of Germany | 369/51 |
| 59-42653 | 3/1984 | Japan | 369/275.4 |
| 0063773 | 4/1985 | Japan | 369/51 |

OTHER PUBLICATIONS

U.S. application Ser. No. 07/639,305 (not enclosed).

*Primary Examiner*—Eugene R. LaRoche
*Assistant Examiner*—Tan Nguyen
*Attorney, Agent, or Firm*—Finnegan, Henderson, Farabow, Garrett & Dunner

[57] ABSTRACT

An information recording medium of this invention comprises a plurality of concentric tracks or a spiral track, having a plurality of recording tracks for recording information, and record pits formed on the recording tracks, said record pits being formed at a predetermined pitch on an innermost recording track, and said record pits being formed in accordance with movement of a position of a target recording track from the innermost track toward an outermost track, while gradually increasing the predetermined pitch at a rate less than that at which linear velocity increases when said information recording medium is rotated at a constant velocity.

4 Claims, 8 Drawing Sheets

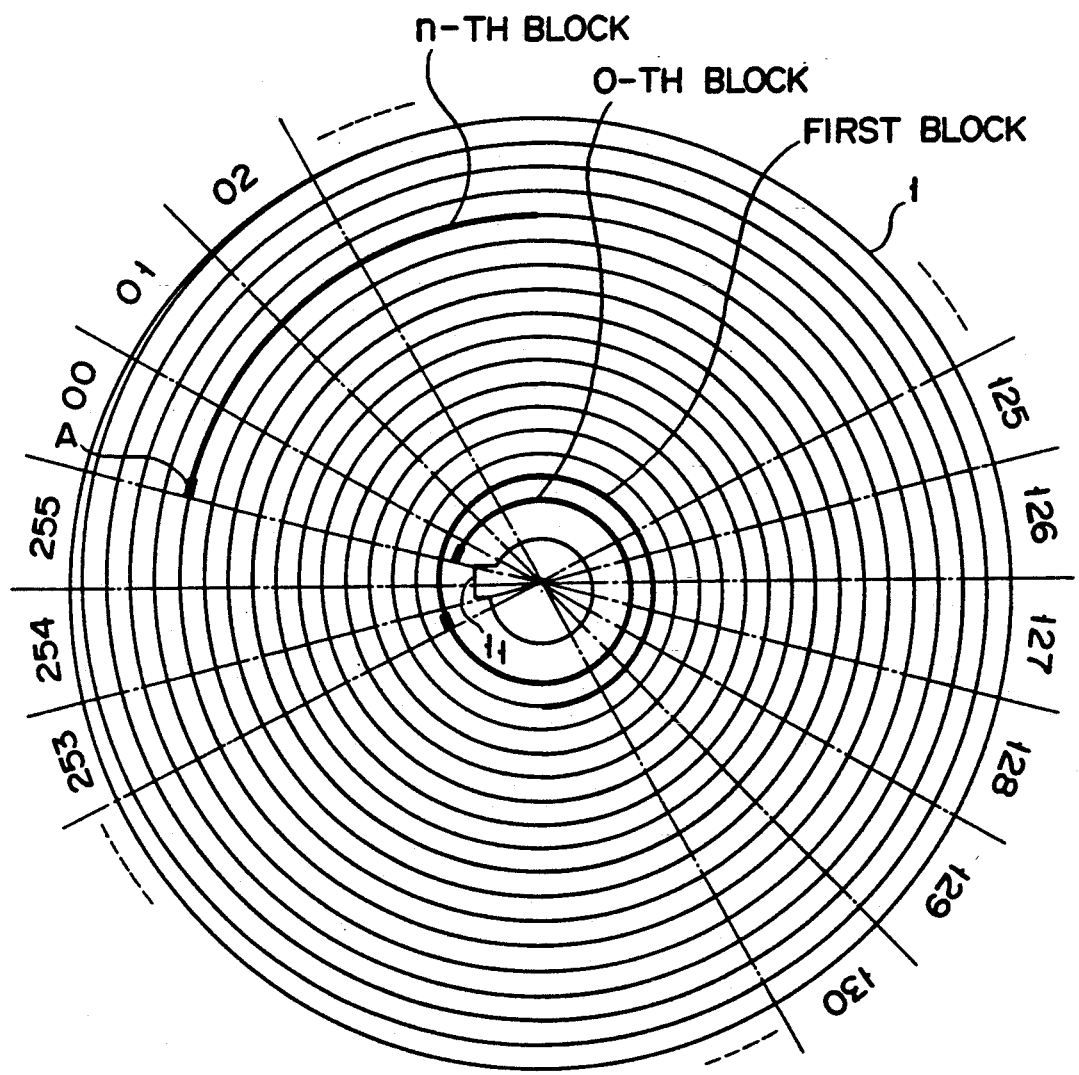
F I G. 1

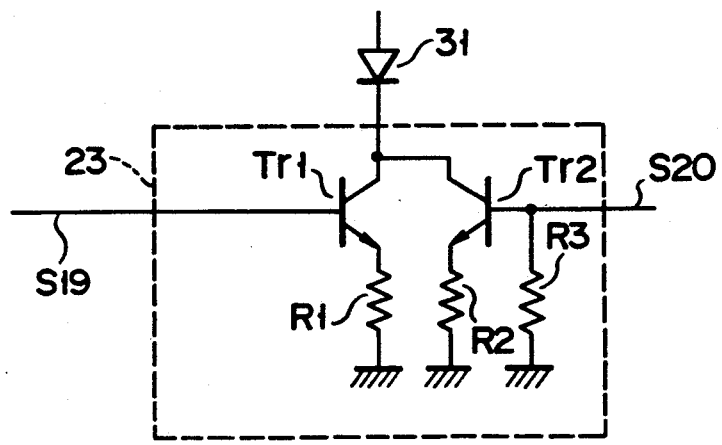
F I G. 7
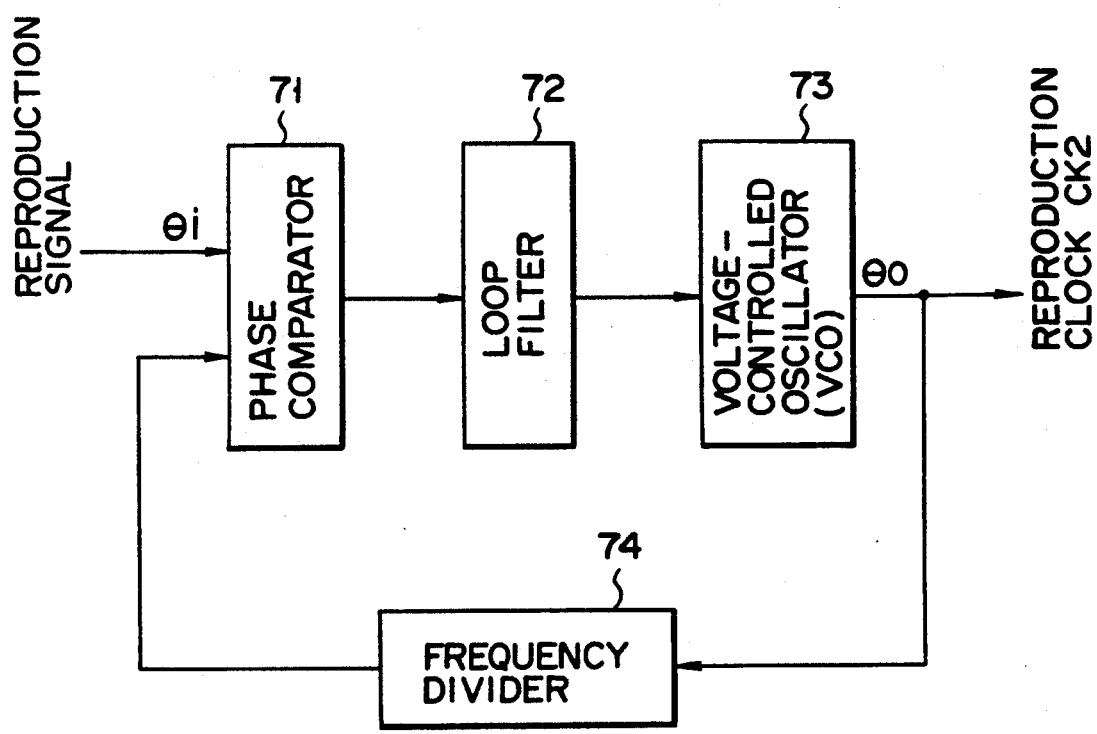
F I G. 8

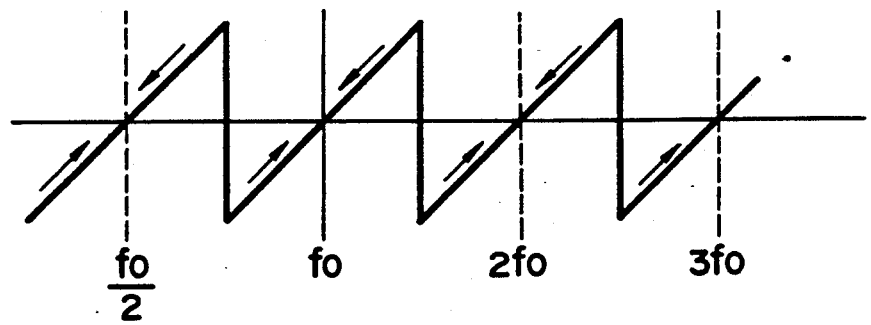
F I G. 9
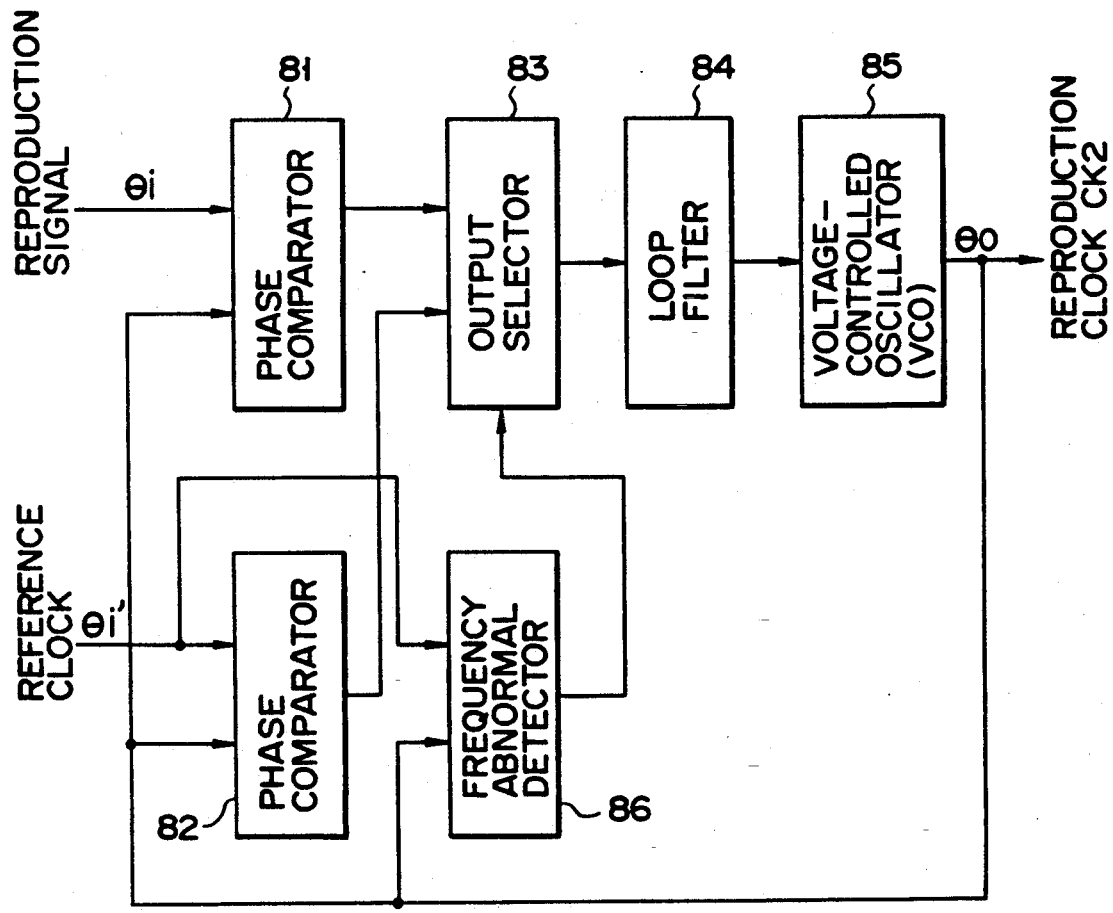
F I G. 10

INFORMATION RECORDING MEDIUM

This application is a continuation of application Ser. No. 07/747,481, filed Aug. 16, 1991, which is a continuation of U.S. Ser. No. 07/456,962 filed Dec. 26, 1989 (now abandoned).

BACKGROUND OF THE INVENTION

1. Field of the Invention

The present invention relates to an information recording medium such as an optical disk for use in an information recording/reproducing apparatus for optically recording and reproducing information, and, more particularly, to an information recording medium with an increased recording capacity and improved reliability of recorded information.

Recently, information recording/reproducing apparatuses, such as optical disk apparatuses, have been developed which record information on an information recording medium such as a write once or erasable optical disk or reproduce information recorded on the recording medium. According to such information recording/reproducing apparatuses, an optical head which emits light is moved by a linear motor in the radial direction of an optical disk so as to face a recording or reproducing position on the disk. When the optical head reaches the target position, it emits light to record information on the optical disk or reproduce information through photoelectric conversion of the reflected light from the optical disk.

A typical recording system for use in such optical disk apparatuses is the CAV (Constant Angular Velocity) system which keeps the number of rotations of the optical disk constant. This CAV system has merits of ensuring stable data recording and reproducing and shortening the required access time. According to this system, however, the number of clocks for data recording and reproducing or the frequency of data modulation and demodulation is constant irrespective of the location of target data on an optical disk, at the innermost track or at the outermost track. Accordingly, an optical disk for use in an optical disk apparatus employing this CAV system has header information preformatted thereon using a header data transfer clock of a constant frequency. The CAV system therefore has a demerit of reducing the data recording density as the target position on the optical disk for data recording or reproducing approaches the outermost track.

There is another recording system for use in optical disk apparatuses, which uses the CLV (Constant Linear Velocity) system. This system provides a constant linear velocity and thus a constant recording density on an optical disk by reducing the angular velocity of the optical disk or the number of rotations per unit time in accordance with movement of the position of an optical head facing the optical disk from the inner track side toward the outer track side while keeping constant the number of clocks for data recording and reproducing or the frequency of data modulation and demodulation irrespective of the location of target data on an optical disk, at the innermost track or at the outermost track. An optical disk for use in an optical disk apparatus employing this CLV system has header information preformatted thereon at a constant linear density. This CLV system can increase the recording density on an optical disk and can therefore increase the recording capacity per optical disk. Due to the necessity to alter the number of rotations of an optical disk, the CLV system requires the time to wait for the rotational speed to reach the desired level. This undesirably results in a longer time for accessing to the target track for data recording or reproducing.

As a solution to the above shortcomings of the CAV and CLV systems, a constant linear density system has been developed which keeps the linear density on an optical disk constant. This system provides a constant recording density on an optical disk by increasing the frequency of the data transfer clock in proportional to movement of the position of an optical head facing the optical disk or the recording position toward the outer track side of the optical disk while keeping the rotational speed of the disk constant.

Since the constant linear density system should increase the frequency of the data transfer clock in accordance with a change in the recording position toward the outermost track, however, it should inevitably satisfy severe data recording conditions on the side of outer tracks on an optical disk. In addition, due to the existence of information recording media of various recording systems, there is a demand for a method for properly identifying the types.

SUMMARY OF THE INVENTION

Accordingly, it is an object of this invention to provide an information recording medium which has a greater recording capacity that what is realized by the CAV type recording system, ensures a sufficiently low access time as compared with the CLV type recording system as well as stable recording at an outer track side of the information recording medium, and can permit easy identification of the types of the recording systems applied to this recording medium.

The information recording medium of the present invention has a plurality of recording tracks formed in concentric or spiral fashion for recording information by record pits formed on the recording tracks. The record pits are formed at a predetermined pitch on an innermost recording track. As the recording track is moved from the innermost track toward an outermost track, the record pits are formed while gradually increasing the predetermined pitch at a rate less the ratio at which linear velocity increases when the information recording medium is rotated at constant angular velocity.

According to this invention, the recording pits are formed on inner tracks of an information recording medium at the same predetermined pitch l as involved in the prior art, and information is recorded by forming the record pits while gradually widening the pitch of the record pits as the position of the target recording track moves toward outer tracks of the information recording medium. Recording information by this recording system can provide a greater recording capacity and loosen the recording conditions at the outer track side of the information recording medium while keeping a high access time, thus ensuring stable information recording.

BRIEF DESCRIPTION OF THE DRAWINGS

FIG. 1 is a diagram illustrating an optical disk as an information recording medium according to this invention;

FIG. 7 is a circuit diagram illustrating the arrangement of a driver for use in the optical disk apparatus;

FIG. 8 is a block diagram showing the basic arrangement of a PLL (Phased-Locked Loop) controller;

FIG. 9 is a waveform diagram for explaining the operation of the PLL controller;

FIG. 10 is a block diagram showing the arrangement of a PLL controller serving as a clock separator used in the optical disk apparatus.

DETAILED DESCRIPTION OF THE PREFERRED EMBODIMENTS

Referring to the accompanying drawings, a detailed description will be given of an optical disk as an information recording medium embodying the present invention and a master plate producing apparatus for making a recording master plate adapted for use in producing this optical disk, and an optical disk apparatus for driving the optical disk.

Referring first to FIG. 1, the schematic structure of an optical disk 1 serving as an information recording medium embodying this invention will be described. An optical disk body is produced by making copy or replica from a recording master plate 1a made using a master plate producing apparatus to be described later. This optical disk body is coated with a metal coat film of tellurium, bismuth or the like in a doughnut shape on the surface of a base plate made of glass, plastic or the like to complete the optical disk 1. A cutaway portion or a reference mark $1_1$ is provided at the proximity of the center of the metal coat layer. The surface of the optical disk 1 is divided into 256 sectors from sector "0" to sector "255" with the reference mark $1_1$ being "0."

Recording systems for this optical disk 1, as mentioned above, include the CAV system, CLV system, the constant linear density system and recording system utilized in this invention (which will be described in detail later). Header information and data are recorded by any of those recording systems. At a predetermined position at the innermost track of the optical disk is a region that specifies by which system, the CAV system, CLV system, the constant linear density system or the system employed in this invention, the optical disk 1 is preformatted. This region is called an identification data recording area. Data recording or reproduction suitable for each recording system can be executed by referring to this area. The identification data recording area is provided at a given position on the inner most track of the optical disk 1 to ensure data reproduction irrespective of the difference in recording density of the record pits formed by the aforementioned recording systems. That is, since the recording density is fixed at the innermost track of the optical disk 1 in any recording system mentioned above, the identification data recorded by any of the recording systems can be read out. A code "00" is recorded as the identification data in the CAV system, "01" in the CLV system, "10" in the constant linear density system, and "11" in the system employed in this invention.

On the optical disk 1, data of a variable length is to be recorded over a plurality of the blocks as shown in FIG. 1. A block header (header data) A consisting of a block number and a track number is to be recorded at the beginning of each block. In a case where each block does not end at the transitional point between sectors, a block gap is provided so that each block should always start from the sector transitional point.

Figure 2:
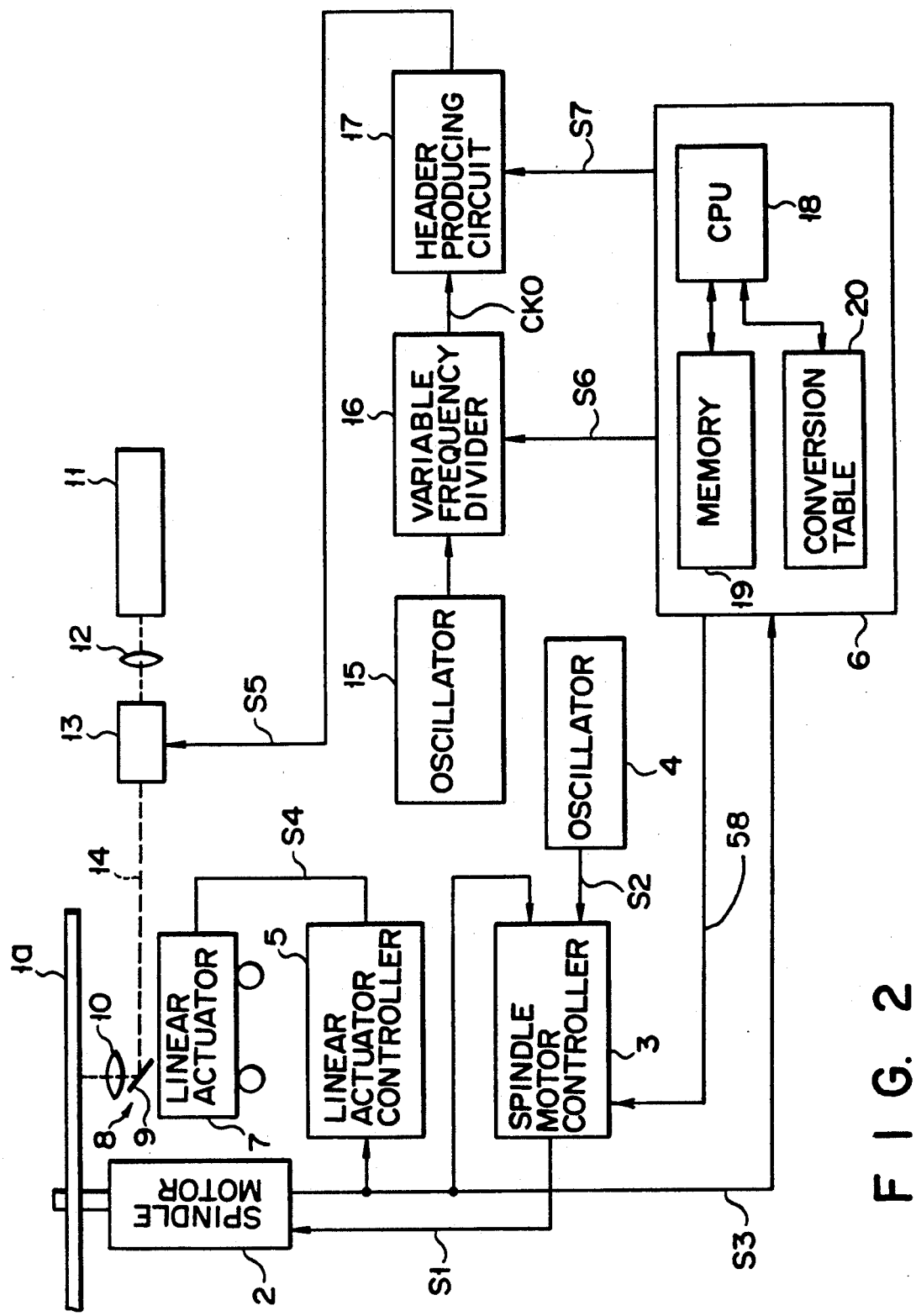
FIG. 2 is a block diagram showing a schematic structure of a master plate producing apparatus for making a recording master plate adapted to produce optical disks as the present information recording medium.

Referring now to FIG. 2, a description will be given of the schematic arrangement of a master plate producing apparatus which produces the recording master plate 1a adapted to preformat the optical disk 1 serving as the present information recording medium. The optical disk 1 has the header information A already written thereon at the initial state. In order to write the header information, i.e., to format the optical disk, the recording master plate 1a produced by the master plate producing apparatus should also have the header information recorded thereon.

The master plate 1a has a photoresist coated on the surface of a polished, disk-shaped base plate made of glass, for example. As shown in FIG. 2, this master plate 1a is mounted to the rotary shaft of a spindle motor 2 to be driven at a constant speed. The driving of the spindle motor 2, such as starting and stopping of the rotation of the motor 2 and the number of its rotations, is controlled by a control signal S1 output from a spindle motor controller 3. The spindle motor 2 outputs a rotation pulse signal S3 at the rate of one pulse per rotation. This pulse signal S3 is supplied to the spindle motor controller 3, a linear actuator controller 5 and a controller 6.

The spindle motor controller 3 compares a reference frequency signal S2 output from an oscillator 4 with the rotation pulse signal S3 from the spindle motor 2, and outputs the control signal S1 to permit the latter signal S3 to approach the former signal S2. This control signal S1 serves to rotate the spindle motor 2 accurately at a constant speed.

The linear actuator controller 5 controls the movement of a linear actuator 7. More specifically, this controller 5, upon receipt of the rotation pulse signal S3 from the spindle motor 2, prepares a linear actuator drive signal S4 which is in turn supplied to the linear actuator 7 to move it 1.6 μm, for example.

The linear actuator 7 is mounted with an optical system 8 (to be described later) which is disposed under the master plate 1a, and moves the optical system 8 in the radial direction of the master plate 1a.

The optical system 8, comprising a mirror 9 and an objective lens 10, receives a laser beam emitted from a high-power gas laser 11. Divergent laser light generated by the gas laser 11 is converted into a laser beam by a collimator lens 12 and is then supplied to an optical modulator 13. The laser beam from the collimator lens 12 undergoes optical modulation in the modulator 13 in accordance with a header data optical modulation input signal S5 (which will be described later) to be a laser beam 14. This beam 14 is supplied to the optical system 8. In the optical system 8, the laser beam 14 is reflected by the mirror 9 and is converged by the objective lens 10 to form a minute spot on the master plate 1a. The header information A is recorded on the photoresist of the master plate 1a with the minute spot.

The recording of the header information A is executed in synchronism with a header data transfer clock CK0. This clock CK0 is prepared by subjecting the output of an oscillator 15 to frequency division in accordance with frequency division data S6 from a controller 6.

The controller 6 controls the rotation of the spindle motor 2 by supplying control signal S8 to the spindle motor controller 3, and performs various other controls including the operational control of a variable frequency divider 16 and a header producing circuit 17. The controller 6 comprises a central processing unit (CPU) 18 constituted by a microcomputer, for example, a memory 19 constituted by a RAM and a ROM, a ROM-based conversion table 20 and other logic circuits. The memory 19 holds a program for operating the CPU 18 and other data. In the conversion table 20, data for preparing the frequency division data S6 to be supplied to the variable frequency divider 16 is stored in association with a track number of the master plate 1a which is one piece of the header information A. The data held in the conversion table 20 serves to provide a character line G3 (see FIG. 3) which shows the frequency of the header data transfer clock CK0 increases in a step-by-step manner as the target position on the master plate 1a moves toward the outermost track in the radial direction thereof, i.e., as the track number increases.

The oscillator 15 generates the most primitive clock signal which alternates at given cycles, and this clock signal is supplied to the variable frequency divider 16.

The variable frequency divider 16 divides a clock signal of a given frequency from the oscillator 15 and outputs the resultant signal as the transfer clock CK0. The frequency dividing ratio in the divider 16 is dynamically determined on the basis of the frequency division data S6 output from the controller 6.

The header producing circuit 17 synchronizes header information signal S7 which is supplied from the controller 6, with the header data transfer clock CK0 from the variable frequency divider 16 and outputs the synchronized signal as a header data optical modulation input signal S5. The output signal S5 of the header producing circuit 17 is supplied to the optical modulator 13. The optical modulator 13 modulates the laser beam coming from the collimator lens 12 in accordance with the received signal S5 and outputs the modulated beam as the laser beam 14 for recording the header information A on the master plate 1a.

Figure 3:
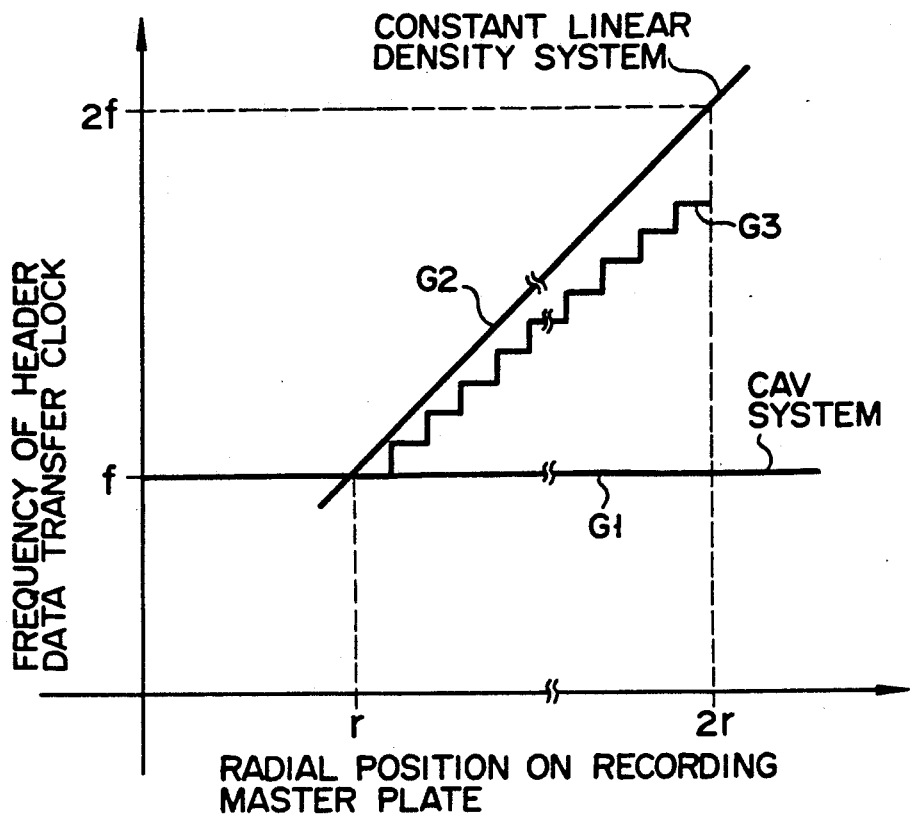
FIG. 3 is a diagram for explaining a header data transfer clock at the time of recording a header information on the recording master plate.
Figure 4:
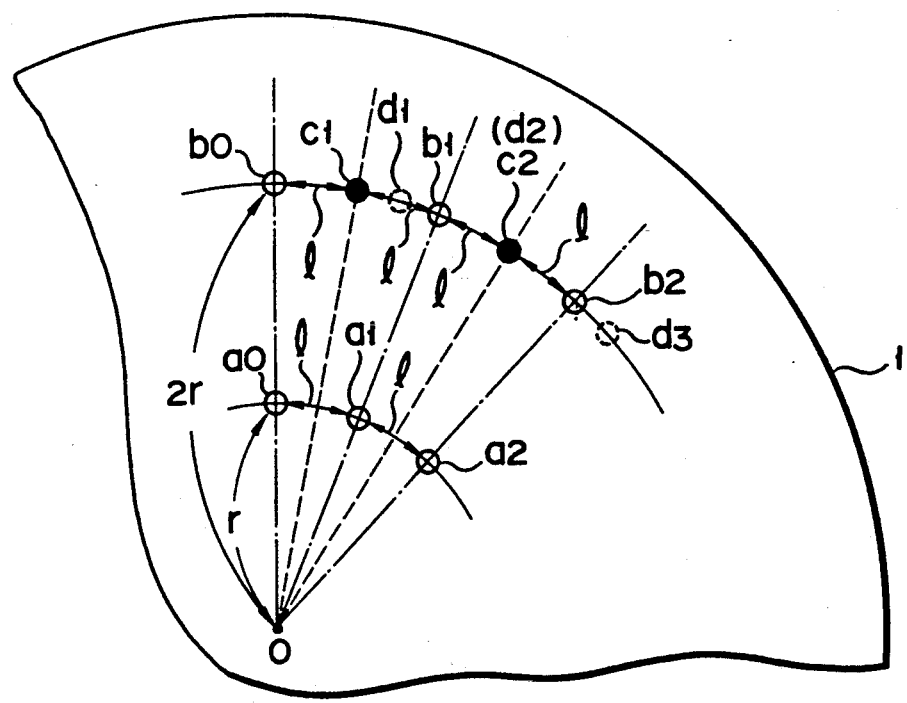
FIG. 4 is a diagram for explaining a record pit pitch at the time of recording the header information on the recording master plate.

A description will now be given of the header data transfer clock CK0 used in recording the header information A onto the master plate 1a. A characteristic line G1 shown in FIG. 3 shows the header data transfer clock for formatting the header information A in the CAV system. In this CAV system the header information A is recorded at a constant frequency irrespective of the radial directional position between r and 2r of the master plate 1a. As shown in FIG. 4, therefore, record pits are formed in the order of a0, a1, a2, ... on the track with a radius r, but they are formed in the order of b0, b1, b2, ... on the track with a radius 2r. In this case, since the number of rotations of the master plate 1a or the angular velocity is constant, given that the pit pitch on the track with a radius r being 1, the pit pitch on the track with a radius 2r becomes 2l.

A characteristic line G2 shows the header data transfer clock for formatting the header information A in the constant linear density system. The frequency of this header data transfer clock linearly increases in proportion to a positional change in the radial direction toward the outermost track on the master plate 1a, i.e., in proportion to an increase in the track number. More specifically, the header data transfer clock has a frequency f at the position of the radius r on the master plate 1a, while it has a frequency 2f, twice higher than the former one, at the position of the radius 2r. As shown in FIG. 4, therefore, record pits are formed in the order of a0, a1, a2, ... as per the CAV system on the track with a radius r, but they are formed in the order of b0, c1, b1, c2, b2, ... on the track with a radius 2r. In this case, since, with the record pit pitch on the track with a radius r being 1, the frequency of the header data transfer clock for a radius 2r is 2f, the record pit pitch on the track with the radius 2r also becomes 1, thus ensuring a constant recording density irrespective of the inner track side or outer track side on the master plate 1a.

The characteristic line G3 shows the header data transfer clock CK0 for formatting the header information A in the present invention. The frequency of this clock CK0 is set to become higher in proportion to a change in the radial directional position on the master plate 1a toward the outer tracks. The characteristic line G3 has a gentler inclination than the characteristic line G2 for the constant linear density system and changes in step. As shown in FIG. 4, therefore, record pits are formed in the order of a0, a1, a2, ... on the track with a radius r as per the CAV system, and has a record pit pitch 1. On the track with a radius 2r, however, record pits are formed in the order of b0, d1, c2 (d2), d3, ... with the record pit pitch being between those of the characteristic lines G1 (CAV system) and G2 (constant linear density system); that is, 1<record pit pitch<2. Thus, the pitch increases as the radius of the track increases at a rate less than that at which linear velocity increases between the tracks when the disk base plate is rotated at a constant velocity.

According to this recording system, therefore, while the recording capacity on the track with a radius 2r is set substantially greater than that on the track with a radius r, the linear density on the latter track is controlled to be substantially smaller than that on the former track. Accordingly, the data recording capacity can be relatively increased and data recording at an outer track portion on the master plate 1a can be stably carried out.

The header data transfer clock CK0 in this recording system is changed in a step-by-step manner, not linearly in accordance with the radial position on the master plate 1a. The employment of this method can facilitate designing of the variable frequency divider 16 and reduce the amount of hardware necessary to constitute the divider 16.

A reproduction signal of the header information A from the optical disk 1 is not synchronized with the header data transfer clock CK0 used in producing the master plate 1a. In other words, the header information A is reproduced by separating a clock from a self clock included in the reproduced digital modulated signal.

Since the header information A is recorded on the optical disk 1 while changing the header data transfer clock CK0 in a step-by-step manner, the frequency of the clock separated from the reproduction signal may differ from the frequency used in recording this header information A at that portion where the clock CK0 changes. If the frequency difference in one step is large, therefore, the header information A cannot be reproduced when accessing tracks other than the one which belongs to the frequency of a predetermined transfer clock. In this respect, if the frequency difference in one step is set lower than a data decoding limit in a case where digital-modulated data is decoded using the frequency of an adjacent header transfer clock CK0, the header information A can be accurately decoded even when the adjacent header data transfer clock region different from the target region is accessed. It is therefore possible to access the target address again.

For instance, the data decoding limit for 2-7 code modulation, which in one digital modulation system is ±6.25%. In this case, no problems would occur if the condition for detecting a frequency abnormality is equal to or less than 6% and a change in one step of the header data transfer clock CK0 used to record the header information A is set smaller than that value. It should therefore be understood that a one percent change in the frequency of the header data transfer clock CK0 per step (i.e., per change in frequency) is sufficient to double the frequency of the header data transfer clock if there are 100 steps (i.e., 100 changes in frequency) as the radial position moves from the innermost track to the outermost track. This facilitates designation of the header data transfer clock CK0 and can prevent the problem otherwise raised in accessing adjacent tracks.

A description will now be given of the relation between the radial directional position on the master plate 1a and the recording density (pit pitch). In heat mode recording where record pits are formed by the heat energy of a focused laser beam, the recording condition is determined by the energy J and the sensitivity of the master plate 1a if the energy density of a focused beam spot is constant irrespective of the radial directional position on the master plate 1a. The energy J is a product of the optical output P of the laser (W: watts) and record pulse width $T_P$ (s: seconds) and is expressed by the following equation.

$$\text{Energy } J = P \times T_P \quad (1)$$

Under this recording condition and also under a condition where the laser emitting performance is limited, the master plate producing apparatus should form pits at the highest speed possible.

Given that the recording region of the master plate 1a ranges from the area of a radius r (hereinafter referred to as inner track) to the area of a radius 2r (hereinafter referred to as outer track), the linear velocity at the outer track is twice the linear velocity at the inner track if the angular velocity of the disk is constant. To obtain the same recording condition at the inner track and the outer track, the recording energy J at these tracks should be set the same. To eliminate the influence of the linear velocity, however, it is desirable that with the energy $J_1$ at the inner track being given by $$J_1 = P_1 \times T_{P1} \quad (2)$$

the energy $J_2$ at the outer track should be given by:

$$J_2 = (2 \cdot P_1) \times (T_{P1}/2) = J_1 \quad (3)$$

In other words, the laser beam emitting energy for data recording at the outer track becomes the same as the one needed at the inner track by doubling the laser beam output $P_1$ and reducing the record pulse width $T_{P1}$ to a half at the outer track. As a result, record pits with a constant shape can be formed irrespective of whether the target is at the inner track or outer track. Due to the limitation of the light emitting performance of the gas laser 11, however, it is actually difficult to double the laser beam output $P_1$. This circumstance should therefore present a very severe recording condition for the constant linear density system in which the optical disk rotates at a constant velocity.

Figure 5:
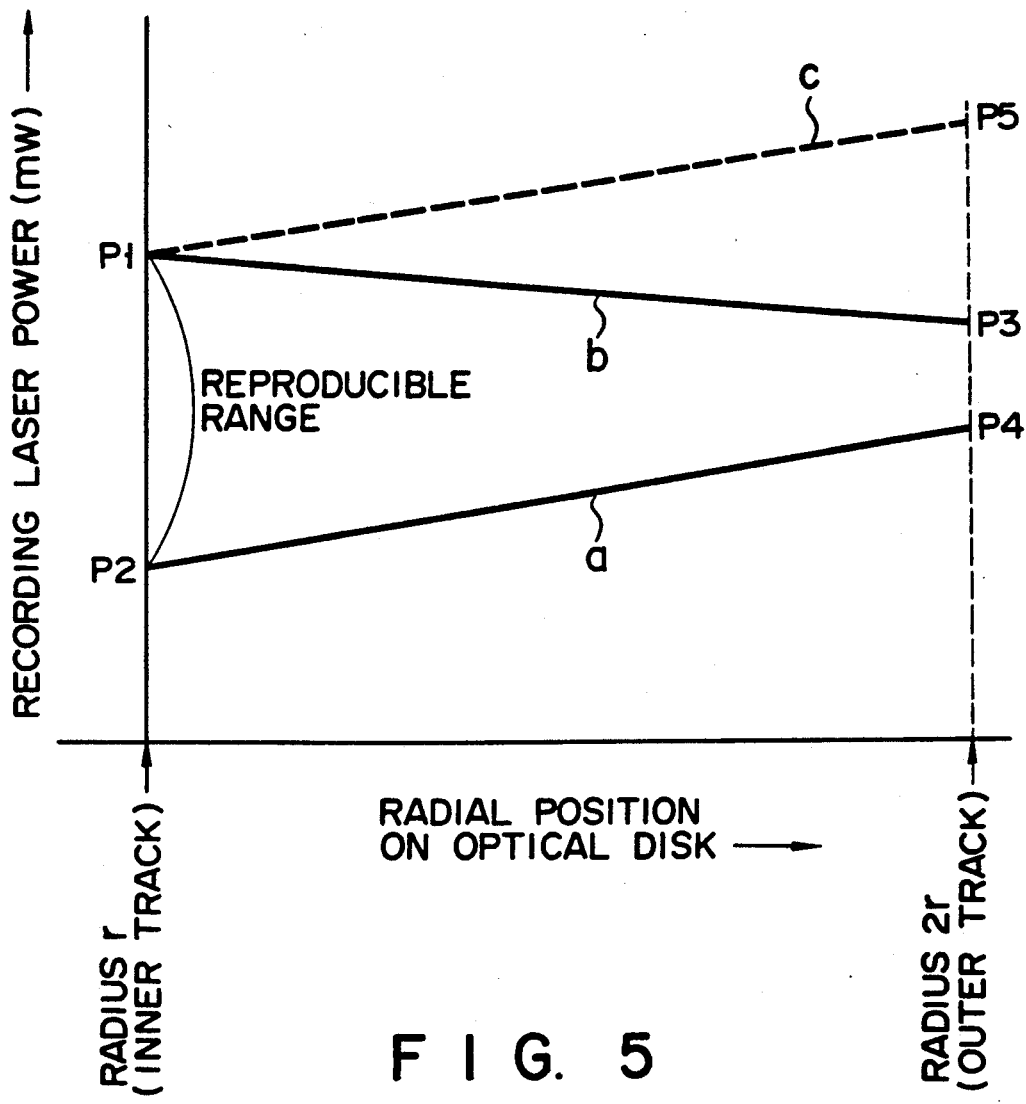
FIG. 5 is a diagram for explaining a recording laser power margin at the time of recording the header information on the recording master plate.

FIG. 5 illustrates the characteristic of the margin of the recording laser power in the constant linear density recording system which was measured with the record pulse width $T_P$ being constant irrespective of the radial directional position on the master plate 1a. In measuring the power, the following procedure was taken. First, determination of the record pulse width $T_P$ and optimization of the record pit pitch at the innermost track (position with a radius r) were executed, then recording was actually carried out while changing the recording laser power. Further, the optical disk 1 was copied from the master plate 1a having the header information A recorded thereon, and data was reproduced from that portion on the optical disk 1 where the header information A was recorded. The measuring resulted in that the lower limit of the recording laser power in a reproducible range is $P_2$ and the upper limit is $P_1$.

As indicated by the real line a in FIG. 5, the lower limit of the recording laser power is $P_2$ at the innermost track of a radius r and $P_4$ at the outermost track of a radius 2r and $P_4 > P_2$. This is because that the linear velocity at the outer track is greater (twice), which requires much recording laser power for data recording.

As indicated by the real line b in FIG. 5, the upper limit of the recording laser power is $P_1$ at the innermost track of the radius r and $P_3$ at the outermost track of the radius 2r and $P_3 < P_1$. This is because that with a constant record pulse width $T_P$, the greater the recording laser power becomes, the larger the record pits formed become at the outer track portion. In this respect, the recording laser power margin is small. It is desirable that this margin be as wide as possible in view of longer stability and reliability of the optical disk apparatus and also be constant irrespective of the recording position on the master plate 1a, i.e., the optical disk 1.

In order to provide the upper limit of the recording laser power as indicated by the dotted line c in FIG. 5, for example, and the recording laser power margin to satisfy "$P_1 - P_2 = P_5 - P_4$", data recording is carried out with the record pit pitch being gradually set wider as the position on the master plate 1a moves toward the outer track according to the present invention. In other words, since the relative linear velocity between the optical head B and the master plate 1a increases in accordance with movement of the optical head 8 from the inner track side toward the outer track side on the master plate 1a, data recording is executed while gradually increasing the interval between record pits by increasing the frequency of the header data transfer clock CK0 with that movement by a given rate lower than the constant linear density system which keeps the pitch of the record pits constant.

The results of the experiments conducted by the present inventors show that the upper limit characteristic of the recording laser power as indicated by the dotted line c can be obtained by recording data with the record pit pitch at the outermost track of the radius 2r being increased by about 10% to realize the same recording laser power margin for the inner track side, as compared with the one used in the constant linear density system.

Further increasing the record pitch as the recording position moves toward the outer track resulted in that the margin of the recording laser power is wider at the outer track portion than at the inner track portion. This means that the data recording with the record pit pitch being increase by about 10% as mentioned above can provide the highest performance, and further increasing the record pit pitch simply decreases the recording capacity and is therefore useless.

It should be understood that the pitch of the record pits on the master plate 1a can be reflected on forming the header information A on the optical disk 1 when this disk is produced from this master plate 1a.

Optical disks 1 for use in an optical disk apparatus can be mass-produced from the master plate 1a having the header information A preformatted in the above manner.

Figure 6:
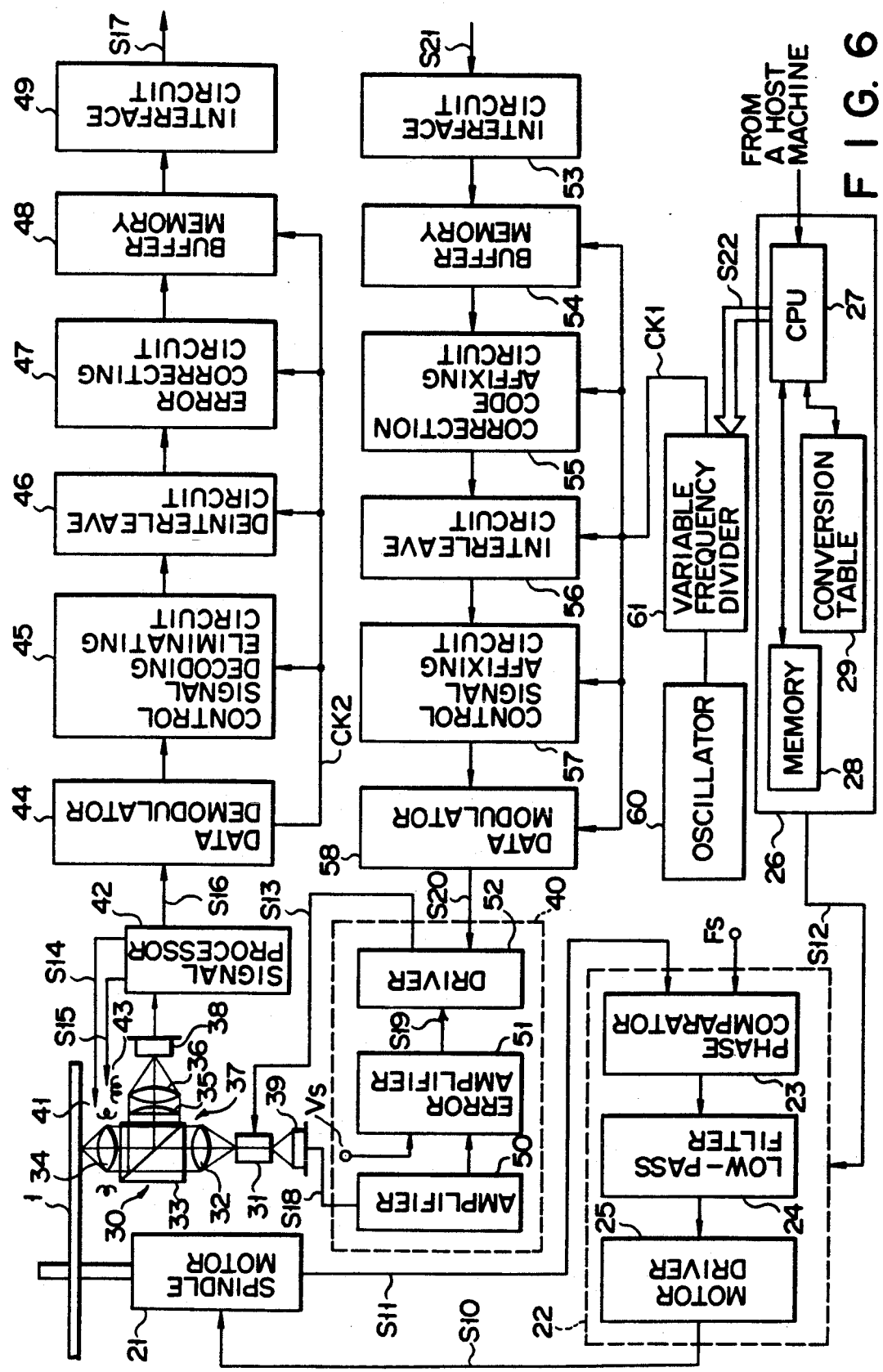
FIG. 6 is block diagram illustrating the structure of an optical disk apparatus for driving an optical disk serving as a information recording medium according to this invention.

Referring now to FIG. 6, a description will be given of an optical disk apparatus for driving the optical disk 1 as the information recording medium of the present invention.

The optical disk 1 copied from the master plate 1a is coupled to and rotated at a constant velocity by a spindle motor 21. The driving of this spindle motor 21, such as starting or stopping its rotation, is controlled by a control signal S10 from a spindle motor controller 22.

The spindle motor controller 22 comprises a phase comparator 23 for comparing the phases of a reference frequency $F_S$ from a frequency oscillator (not shown) and a rotation pulse signal S11 from the spindle motor 21 which corresponds to the number of rotations of the motor 21, a low-pass filter 24 for eliminating a high-frequency component of the output signal of the phase comparator 23, and a motor driver 25 for amplifying the output signal of the low-pass filter 24 and supplying it to the spindle motor 21 to drive it. The spindle motor controller 22 outputs the control signal S10 for accurate synchronization with the reference frequency $F_S$ in accordance with a control signal S12 from a controller 26. This control signal S10 permits the spindle motor 21 to accurately rotate at a given number of rotations.

The controller 26 comprises a central processing unit (CPU) 27 constituted by a microcomputer, for example, a memory 28 constituted by a RAM and a ROM, a conversion table 29 (to be described in detail later) constituted by a ROM, and other logic circuits. The controller 26 perform various controls (to be described later) in addition to rotational control of the spindle motor 21.

An optical head 30 is disposed under the optical disk 1. This optical head 30 accesses the optical disk 1 for data recording and reproducing, and comprises a semiconductor laser oscillator 31, a collimator lens 32, a beam splitter 33, an objective lens 34, a well-known astigmatism optical system 37, which includes a cylindrical lens 35 and a convex lens 36, and a photosensor 38. A photosensor 39 is disposed at the proximity of the semiconductor laser oscillator 31 of the optical head 30. This optical head 30 is provided movable in the radial direction of the optical disk 1 by a moving mechanism (not shown) constituted by a linear motor, for example. The optical head 30 is moved to a target track for data recording or reproducing by the moving mechanism which is driven by control signal from the controller 26.

The semiconductor laser oscillator 31 generates a divergent laser beam in accordance with a drive signal S13 from an optical output controller 40. In recording information on the optical disk 1, the oscillator 31 generates a high-intensity laser beam whose intensity is modulated in accordance with information to be written. In reading information from the optical disk 1 for data reproduction, the oscillator 31 generates a laser beam with a constant low intensity.

The divergent laser beam from the semiconductor laser oscillator 31 is converted into parallel beams by the collimator lens 32, and the resultant beams are led to the beam splitter 33. After passing the beam splitter 33, the laser beams enter the objective lens 34 which in turn converges the beams onto the recording film of the optical disk 1.

The objective lens 34 is suspended in such a way that it is movable in the direction of its optical axis by a lens actuator 41 serving as a lens driving mechanism. When a focus servo signal S14 is supplied to the lens actuator 41 from a focus servo circuit (not shown) provided in a signal processor 42, the objective lens 34 is moved in the optical axial direction. At this time, a signal corresponding to the intensity of the laser beam converged on the surface of the optical disk 1 through the objective lens is fed back to the signal processor 42 to thereby form a focus servo loop, thus rendering the objective lens 34 to a focused state. With the minimum beam spot being formed on the surface of the recording film of the optical disk 1, the objective lens 34 is set at the focused state.

The objective lens 34 is also suspended in such a way that it is movable in the direction normal to the optical axis and in the radial direction of the optical disk by a lens actuator 43. When a tracking servo signal S15 is supplied to the lens actuator 43 from a tracking servo circuit (not shown) provided in the signal processor 42, the objective lens 34 is moved in the direction normal to the optical axis. At this time, a signal corresponding to the intensity of the laser beam irradiated on tracks the surface of the optical disk 1 through the objective lens is fed back to the signal processor 42 to thereby form a tracking servo loop, thus rendering the objective lens 34 to an ON track state. When the reflected light from a track on the optical disk becomes a predetermined balanced state, the objective lens 34 comes to the ON track state. In the focused state and ON track state, information can be written on or read out from the optical disk 1.

In the focused state, the divergent laser beam reflected from the optical disk 1 is converted into parallel beams by the objective lens 34, which are then returned to the beam splitter 33. The beams passing through the beam splitter 33 are led onto the photosensor 38 by the astigmatism optical system 37. This photosensor 38 detects a focus error by detecting a change in shape of a laser beam and detects a tracking error by detecting deviation of the laser beam from its proper beam converging position.

The photosensor 38 is constituted by four photo-sensing cells not shown) which convert a laser beam led thereon by the astigmatism optical system 37 into an electrical signal. Signals output from these four photo-sensing cells are sent to the signal processor 42, which in turn causes the focus servo circuit (not shown) to generate the focus servo signal S14 based on the received signals. This focus servo signal S14 is supplied to the actuator 43 to thereby form the focus servo loop. Further, upon reception of the output signals from the photosensing cells, the tracking servo circuit (not shown) in the signal processor 42 produces the tracking servo signal S15. This signal S15 is supplied to the actuator 43 to thereby form the tracking servo loop. A reproduction signal S16 output from the signal processor 42 represents information recorded on the optical disk 1, and is sent to a data demodulator 44.

The data demodulator 44 serves to demodulate the reproduction signal S16 from the signal processor 42. The demodulated signal from the data demodulator 44 is supplied to a control signal decoding/eliminating circuit 45.

This circuit 45 serves to detect and removes a control signal such as a sync code, affixed at the time of data recording, from the demodulated signal from the data demodulator 44. Data having the control signal removed by the circuit 45 is supplied to a deinterleave circuit 46.

The deinterleave circuit 46 serve to restore data interleaved at the time of data recording to the original data sequence. The interleaving is one of data recording methods which divides sequential data to be recorded on the optical disk 1 into predetermined units and rearrange those units to be non-sequential before recording them. This method improves the performance to correct a burst error when such occurs. A signal deinterleaved by the deinterleave circuit 46 is supplied to an error correcting circuit 47.

The error correcting circuit 47 serves to detect and correct a 1-bit error or an error consisting of two or more bits, which is included in the deinterleaved data. The error-corrected data from the circuit 47 is supplied to a buffer memory 48. When the circuit 47 detects no error in the deinterleaved data, this data is of course supplied as it is to the buffer memory 48.

The buffer memory 48 temporarily stores error-free data from the error correcting circuit 47. The data temporarily stored in the buffer memory 48 is supplied to an interface circuit 49 at a given timing.

The interface circuit 49 serves to control data exchange with a host machine (not shown) acting as an external unit, for example. In other words, data reproduced from the optical disk 1 is sent as a reproduction signal S17 via the interface circuit 49 to the external unit.

The photosensor 39, constituted by a photoelectric converting element such as a photodiode, is provided on the opposite side to that of the semiconductor laser oscillator 31 from which recording or reproducing laser beam is emitted. The photosensor 39 serves to perform photoelectric conversion of monitor beam from the mentioned opposite light emitting port. That is, upon reception of a monitor beam from the oscillator 31, the photosensor 39 converts the beam into an electric signal (optical current) and then sends it as an optical output monitor signal S18 of the oscillator 31 to the optical output controller 40.

The controller 40 performs such a control as to maintain the optical output of the semiconductor laser oscillator 31 constant. In other words, the controller 40 receives the optical output monitor signal S18 from the oscillator 31 to thereby execute a feedback control in order to keep the optical output of the oscillator 31 constant. This controller 40 comprises an amplifier 50, an error amplifier 51 and a driver 52.

The amplifier 50 converts the monitor signal S18, output as an optical current by the photosensor 39, into a voltage signal then amplifies the signal. The output of this amplifier 50 is a voltage signal corresponding to the intensity of light received by the photosensor 39 or the optical output from the semiconductor laser oscillator 31. The output of the amplifier 50 is supplied to the error amplifier 51.

The error amplifier 51 amplifies the difference between the output signal of the amplifier 50 and a reference voltage $V_S$. More specifically, the error amplifier 51 compares the output voltage of the amplifier 50 as one input with the reference voltage $V_S$ produced from a constant voltage source (not shown) as the other input, amplifies the difference between these two inputs and outputs the resultant signal. The output of the error amplifier 51 is supplied as an error signal S19 to the driver 52. The driver 52 drives the semiconductor laser oscillator 31, thus forming a feedback loop. In other words, the optical output controller 40 subjects the output signal of the amplifier 50 to feedback control to permit it to approach the reference voltage $V_S$, so that a constant optical output is provided from the oscillator 31. The reference voltage $V_S$ is a constant voltage for allowing the oscillator 31 to emit a laser beam with a given level necessary for data reproduction.

The driver 52, which drives the semiconductor laser oscillator 31 as mentioned above, comprises two transistors Tr1 and Tr2 and resistors R1 to R3 as shown in FIG. 7. The transistor Tr1 has its base supplied with the error signal S19 from the error amplifier 51. The transistor Tr1 further has its collector coupled to the oscillator 31 and emitter grounded via the resistor R1. The transistor Tr2 has its base supplied with a record pulse signal S20 corresponding to data to be recorded, this signal S20 being output from a data modulator 58 to be described later. The base of this transistor Tr2 is grounded via the resistor R3. The transistor Tr2 further has its collector coupled to the oscillator 31 and emitter grounded via the resistor R2. With the above arrangement, the error signal S19 is supplied to the base of the transistor Tr1 at the time of data reproduction. This permits a drive current to flow through the collector of the transistor Tr1, and the semiconductor laser oscillator 31 emits sequential laser beams with a low intensity. At the time of data reproduction, the transistor Tr2 is turned off. That is, the oscillator 31 is driven only by the transistor Tr1. At the time of data recording, the base of the transistor Tr1 is supplied with that voltage signal which is obtained by causing a sample and hold circuit (not shown) to hold the voltage supplied at the time of the immediately previous data reproduction. As a result, the same drive current as attained at the time of data reproduction flows through the collector of the transistor Tr1. Meanwhile, the record pulse signal S20 is supplied to the base of the transistor Tr2. As a result, a drive current variable according to record data flows through the collector of the transistor Tr2. Accordingly, the semiconductor laser oscillator 31 is driven by a signal having those signals flowing through the transistors Tr1 and Tr2 superimposed one upon another and intermittently emits high-intensity laser beams in accordance with the record data.

The interface circuit 53 serve to control data exchange with a host machine (not shown) acting as an external unit, for example. In other words, record data S21 supplied from the external unit is sent via the interface circuit 53 to a buffer memory 54.

The buffer memory 54 temporarily stores the record data S21 sent through the interface circuit 53, and the data in this memory 54 is supplied to a correction code affixing circuit 55 at a given timing.

The circuit 55 serves to detect a 1-bit error or an error consisting of two or more bits and affix a redundant code for permitting correction of the error. The record data having the correction code added by the circuit 55 is supplied to an interleave circuit 56.

The interleave circuit 56 serves to improve the performance of correcting a burst error when such occurs. In other words, the interleave circuit 56 rearrange sequential data in order to record it in dispersed manner on the optical disk 1. With this interleaving being executed for data recording, even if part of data is sequentially destroyed due to, for example, damaging of the optical disk, the destroyed sequential data can be dispersed by performing the aforementioned deinterleaving operation at the time of data reproduction. This reduces the number of errors included in a predetermined unit of data and increases the possibility of correcting the data by the added correction code. The record data interleaved by the interleave circuit 56 is supplied to a control signal affixing circuit 57.

This circuit 57 affixes a control signal such as a sync code to the record data interleaved by the interleave circuit 56. The record data having such a control signal affixed thereto is supplied to a data modulator 58.

The data modulator 58 performs a digital modulation so that the record data becomes a signal suitable for data recording. The data modulator 58 includes a ROM (not shown) in which predetermined data is stored in advance. The data modulator 58 refers to the ROM in accordance with input record data to execute the digital modulation. The modulated record data is output as the serial record pulse signal S20 through a register (not shown). The pulse signal S20 is supplied to the base of the transistor Tr2 constituting the driver 52, and drives the semiconductor laser oscillator 31 as described above. As a result, the oscillator 31 intermittently emits a high-intensity laser beam according to the record data to record information on the optical disk 1.

The aforementioned buffer memory 54, correction code affixing circuit 55, interleave circuit 56, control signal affixing circuit 57 and data modulator 58 operate in synchronism with a transfer clock CK1, which is supplied from a variable frequency divider 61.

The oscillator 60 generates the most primitive clock signal which alternates at given cycles, and this clock signal is supplied to the variable frequency divider 61.

The variable frequency divider 61 divides a clock signal of a given frequency from the oscillator 60 and outputs the resultant signal as the transfer clock CK1. The frequency dividing ratio in the divider 61 is dynamically determined on the basis of set data S22 output from the controller 26. The set data S22 is stored in the conversion table 29 constituted by a ROM in the controller 26. The conversion table 29 receives a track number which is one piece of header information A of the optical disk 1 and outputs data corresponding to this track number. The conversion table 29 holds data which provides such a characteristic as to increase in a step-by-step manner the frequency of the data transfer clock CK1 as the track number is increased. That is, the conversion table 29 holds the same data as stored in the conversion table 20, which is used to format the master plate 1a as already described referring to FIG. 3. This means that data can be recorded on the optical disk 1 with the same transfer clock as used in recording format data on the master plate 1a.

The characteristic line G1 shown in FIG. 3 also represents the characteristic of the data transfer clock in the CAV system, the characteristic line G2 the characteristic of the data transfer clock in the constant linear density system, and the characteristic line G3 the data transfer clock used in the present invention. As the individual characteristic lines G1 to G3 are the same as those used to produce the master plate 1a, their description will be omitted here.

According to the recording system employed in the present invention, as in the case where the header information A is recorded on the master plate 1a, while the recording capacity on the track with a radius 2r is set substantially greater than that on the track with a radius r, the linear density on the latter track is controlled to be substantially smaller than that on the former track. Accordingly, the data recording capacity can be relatively increased and data recording at an outer track portion on the optical disk 1 can be stably carried out.

The data transfer clock CK1 in this recording system is changed in step, not linearly in accordance with the radial position on the optical disk 1 as in the constant linear density system, as in the case where the header information A is recorded on the master plate 1a. The employment of this method can simplify the arrangement of the variable frequency divider 61 and reduce the amount of hardware necessary to constitute the divider 61.

A description will now be given of a clock used for data reproduction. A signal reproduced from the optical disk 1 is asynchronous with the data transfer clock CK1. A reproduction clock CK2, which is supplied to the data demodulator 44, control signal decoding-/eliminating circuit 45, deinterleave circuit 46, error correcting circuit 47 and buffer memory 48, is produced by separating a clock from a self clock included in the reproduced digital modulated signal. The separation of the clock is executed by a clock separator included in the data demodulator 44. This clock separator is constituted by a PLL controller.

The PLL controller basically comprises a phase comparator 71, a loop filter 72, a voltage-controlled oscillator (VCO) 73 and a frequency divider 74, as shown in FIG. 8. These elements, when connected as illustrated in FIG. 8, constitute a feedback loop.

Generally, binary data of a signal reproduced from the optical disk 1 has undergone digital modulation. To separate a self clock signal included in this digital modulation signal, the binary data is input as a reproduction signal to the phase comparator 71. Only upon reception of an input pulse, the phase comparator 71 compares the phase $\theta i$ of the input with the phase $\theta o$ of the output. FIG. 9 illustrates the phase comparison characteristic.

Since the phase $\theta i$ of the input is compared with the phase $\theta o$ of the output only at the edge of the input pulse, there exist a plurality of frequencies which cause phase locking as shown in FIG. 9. To avoid such a circumstance, a frequency abnormal detector 86 is used to permit accurate clock separation from the digital modulation signal obtained at the time of data reproduction. That is, as shown in FIG. 10, the actual PLL controller comprises phase comparators 81 and 82, an output selector 83, a loop filter 84, a voltage-controlled oscillator 85 and the mentioned frequency abnormal detector 86. These elements, when connected as illustrated in this diagram, form a feedback loop.

Referring to FIG. 10, in accessing an address (track number) portion with different radial positions, first the reference clock of a frequency $\theta i'$ according to the address is input to invoke the phase loop and is compared with the frequency $f_0$. Then, at the time of accessing the above address, the signal to be supplied to the loop filter 84 is switched to the output of the phase comparator 81 from the output of the phase comparator 82 by the output selector 83 to thereby execute the phase locking. This permits accurate clock separation so that header information A such as a track number can be decoded.

Figure 11:
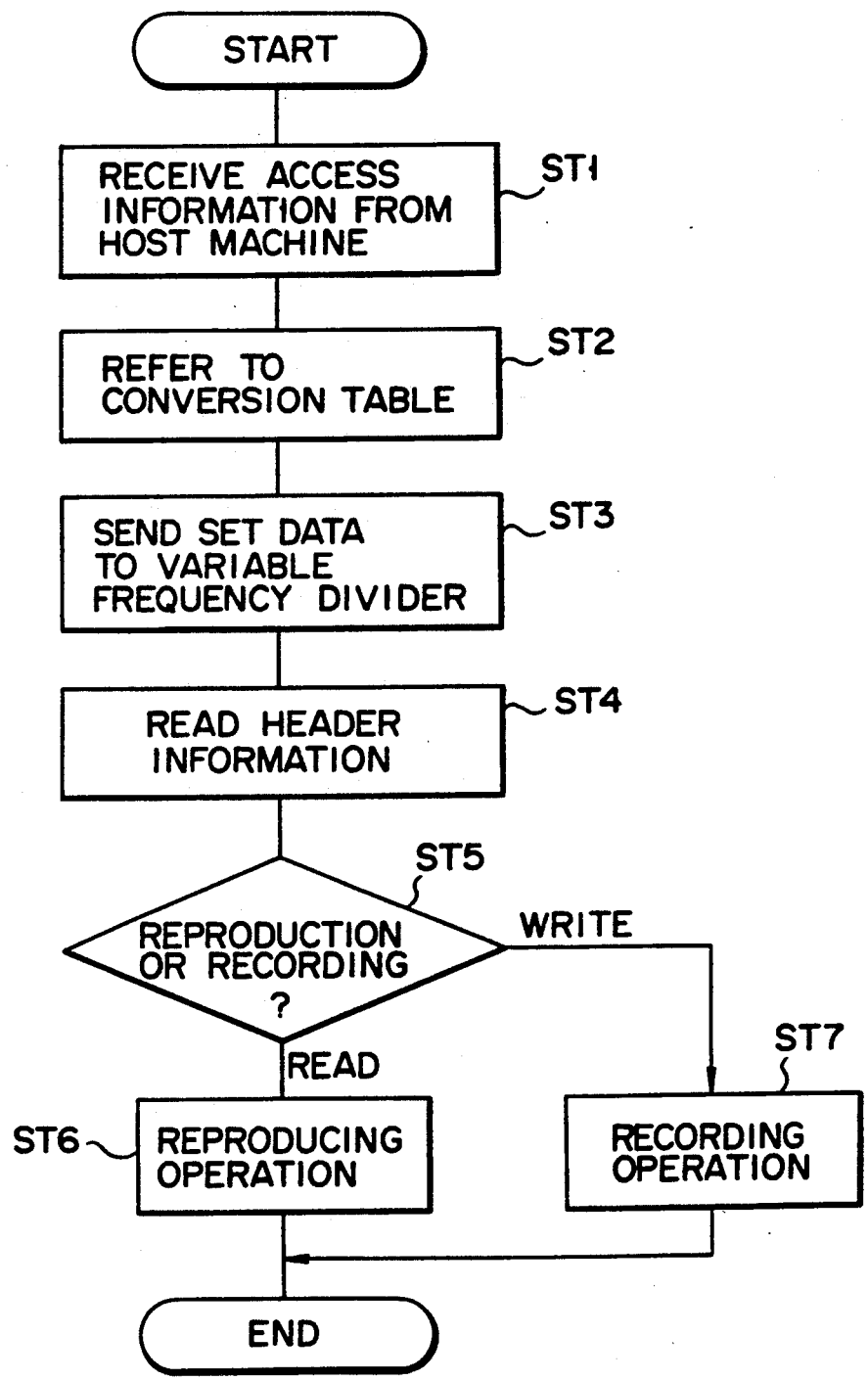
FIG. 11 is a flowchart for explaining an operation involved in recording information on or reproducing it from an optical disk as the present information recording medium.

Referring now to the flowchart given in FIG. 11, the control operation of the above-described arrangement, operation involving the transfer clock, will be explained.

When an access request is generated from a host machine (not shown) and a signal to that effect is supplied to the controller 26, the present optical disk apparatus starts functioning. First, the CPU 27 in the controller 26 receives access information from the host machine (step ST1). This access information includes a track number and a sector number for specifying the position on the optical disk 1 to be accessed and a command for specifying an operation. The access information is stored in the memory 28 and will be referred when needed in the following process. Then, the CPU 27 refers to the conversion table 29 (step ST2). More specifically, the CPU 27 extracts the track number from the access data stored in the memory 28 and sends it to the conversion table 29. The fetched track number is an address input of the ROM constituting the conversion table 29, and the table 29 outputs data associated with the track number. The CPU 27 sends the data read out from the conversion table 29 as the set data S22 to the variable frequency divider 61 (step ST3). As a result, the frequency divider 61 outputs the data transfer clock CK1 with a frequency according to the track number, and this clock is supplied to the buffer memory 54, correction code affixing circuit 55, interleave circuit 56, control signal affixing circuit 57 and data modulator 58.

Then, header information is read out (step ST4). In reading the header information, a coarse access is conducted first so that the optical head 30 is moved to the target track position by the moving mechanism (not shown). This target track position in the coarse accessing operation is determined by referring to the track number in the access information stored in the memory 28. The header information is reproduced at the track position on the optical disk 1 which the optical head 30 now faces after the coarse access. The track number included in the reproduced header information is compared with the track number of the target track position to check if the optical head 30 is on the target track. If the optical head 30 is off the target track, the tracking servo circuit (not shown) in the signal processor 42 is driven to slightly move the objective lens 34 of the optical head 30 in the direction normal to the optical axis to execute a fine access for directing the laser beam accurately on the target track. If the track number included in the reproduced header information coincides with that of the target track position to provide the track ON state by this fine access, data recording or reproducing becomes possible.

It is then discriminated whether or not the operation requested by the host machine is data reproduction or data recording by referring to the command in the access information stored in the memory 28 (step ST5). If the command specifies the data reproduction, the above-described reproducing operation is executed (step ST6). At this time, the reproduction clock CK2 to be supplied to the data demodulator 44, control signal decoding/eliminating circuit 45, deinterleave circuit 46, error correcting circuit 47 and buffer memory 48, which are hardware for the data reproducing system, is produce by separating the self clock from the reproduction data S16 by means of the data demodulator 44, as explained earlier.

If the command is found to specify data recording in step ST5, the above-described data recording is executed (step ST7). At this time, as described earlier, since the transfer clock CK1 output from the variable frequency divider 61 is supplied to the buffer memory 54, correction code affixing circuit 55, interleave circuit 56, control signal affixing circuit 57 and data modulator 58, which are hardware for the data recording system, record pits are formed by a lasser light modulated in accordance with the transfer clock whose frequency is controlled in accordance with the track number. The record pit pitch gradually increases in a step-by-step manner, not linearly, as the recording position approaches the outer track of the optical disk 1.

As described above, the use of the above-described recording system to record data on the optical disk 1 copied from the master plate 1a preformatted by the same recording system can provide a greater recording capacity per optical disk than is realized by the CAV type recording system. Further, data recording is done in such a way that the linear density becomes lower (the record pit pitch becomes larger) as the recording position moves outward. The recording condition can be significantly loosened without reducing the recording capacity so much as compared with the CLV system and constant linear density system. In other words, the present invention can provide an information recording medium with a higher reliability which can ensure the substantially the same recording capacity as obtained by the CLV system, can stably keep the recording laser power margin at both the inner and outer tracks by recording information in such a way that the record pit pitch is increased by about 10% at the outer track position of a radius 2r, as compared with the constant linear density system which performs data recording with a fixed record pit pitch between the innermost track and the outermost track of the optical disk.

Since data representing the type of the recording system used for an optical disk in use is recorded on an identification data recording area provided at a specific position at the innermost track portion of this disk, it is possible to automatically alter the recording system or inform an operator of the disk being improper by referring to this identification data recording area, at the time of data is recorded on this optical disk by an information recording/reproducing apparatus.

According to the present recording system, in gradually widening the record pit pitch, the header data transfer clock specifying the recording timing is changed step by step so that a change in header data transfer clock per step is set to about 1%, i.e., about 100 steps as a whole are provided for the transfer clock. This can reduce the amount of hardware necessary for generation of the header data transfer clock and can therefore simplify the arrangement in addition to the ability to accurately access to the target track.

Furthermore, since the number of rotations of an optical disk is kept constant, the accessing time can be set sufficiently high as compared with the recording system involving the CLV system.

Although the foregoing description has been given with reference to optical disks which have recording tracks formed in a spiral form, the present invention can also be applied to optical disks having recording tracks formed in a concentrical manner with the same effects as attained by the above-described embodiment.

What is claimed is:

1. An information recording medium, comprising:
 a disk-shaped base plate;
 a metal coat film provided on the base plate;
 a plurality of tracks provided on the metal coat film, said plurality of tracks having one of a spiral form and a concentric form; and
 a plurality of record marks provided in a predetermined portion of each of the tracks, a pitch of the record marks being uniform within each track, the pitch increasing as the radius of the track increases at a rate less than that at which linear velocity increases between the tracks when the disk base plate is rotated at a constant velocity.

2. The information recording medium according to claim 1, wherein the predetermined portion is a header portion of each of the tracks in which address data of the track is recorded by a plurality of record marks.

3. The information recording medium according to claim 1, wherein thepitch of the record mark on a track having a radius of 2r is larger than a pitch L of the record mark on a track having a radius r and smaller than 2L.

4. The information recording medium according to claim 1, wherein the innermost track further includes an area in which data relating to change of the pitch of the record mark is stored.

* * * * *